March 24, 1942.   W. P. MAINES   2,277,496
SLIPPER PAD FOR CRANKLESS MECHANISMS
Filed Dec. 18, 1939
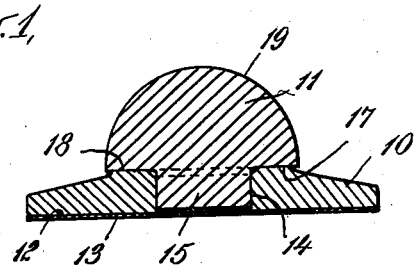
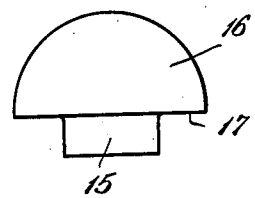
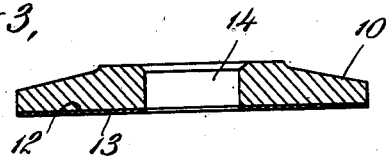
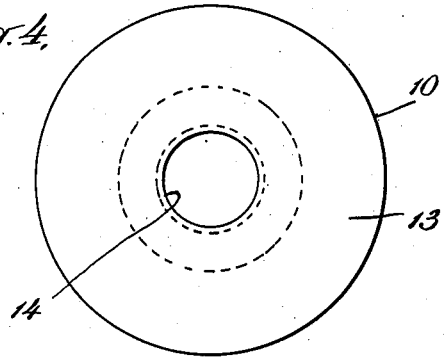
INVENTOR
William P. Maines
BY
Marshall & Hawley
ATTORNEYS Patented Mar. 24, 1942

2,277,496

UNITED STATES PATENT OFFICE 2,277,496

SLIPPER PAD FOR CRANKLESS MECHANISMS

William P. Maines, Kenmore, N. Y., assignor to Michell-Crankless Engines Corporation, New York, N. Y., a corporation of New York Application December 18, 1939, Serial No. 309,732

2 Claims. (Cl. 308—3)

This invention relates to slipper pads for crankless mechanisms.

Slipper pads of the type used in crankless engines, such as that shown in Patent 1,819,826, are formed with a substantially flat or plane bearing surface for engagement with the slant or swash plate and with a spherical bearing surface for engagement with the yoke or member which receives the piston movement and transmits this movement to the slant.

The slipper bearing elements or pads are preferably made of steel and the plane or flat surface is usually surfaced or coated with a suitable bearing metal, such as bronze. The spherical bearing surface is heat treated to harden it. This heat treatment damages or is detrimental to the surface coated with the bearing metal.

This invention has for its salient object to provide a simple and practical construction of slipper pad or bearing element having a plane bearing surface coated or surfaced with suitable bearing metal and a hardened spherical bearing surface.

Another object of the invention is to provide a slipper pad or bearing element so constructed and arranged that either the plane or spherical bearing surface can be replaced in case of wear or damage.

Further objects of the invention will appear from the following specification taken in connection with the drawing which forms a part of this application, and in which Fig. 1 is a sectional elevation of a slipper pad or bearing element constructed in accordance with the invention;

Fig. 2 is an elevational view of the spherical bearing portion of the slipper;

Fig. 3 is a sectional elevation of the plane bearing portion of the slipper; and Fig. 4 is a bottom plan view of the structure shown in Fig. 1.

In the embodiment of the invention illustrated, the slipper pad or bearing element comprises two parts 10 and 11. The part 10 has a plane or relatively flat bearing surface 12 which is coated with a surface of suitable bearing metal 13, such as bronze.

The part 10 has a central opening 14 therethrough.

The portion or part 11 of the slipper pad has a centrally disposed cylindrical projection 15 which is arranged to have a force fit in the opening 14 of the member or part 10. It will be noted that the end surface of the projection 15 does not extend entirely through the opening 14 and is spaced slightly from the plane of the surface 12 thereof.

The part 11 has a spherical bearing portion 16 and an annular flat bearing surface 17 arranged to seat on the surface 18 of the part 10.

The slipper bearing element or pad is preferably made of steel and the spherical surface 19 of the portion 11 is heat treated to harden the spherical bearing.

By constructing the slipper pad element in the manner above described, the surface 12 can be coated with the bearing metal 13 and the spherical bearing portion can be heat treated without damaging the plane bearing surface. Furthermore, either the spherical bearing portion or the plane bearing portion can be replaced in case of damage without the requirement of an entirely new bearing pad or slipper.

Although one specific embodiment of the invention has been particularly shown and described, it will be understood that the invention is capable of modification and that changes in the construction and in the arrangement of the various cooperating parts may be made without departing from the spirit and scope of the invention, as expressed in the following claims.

What I claim is:

1. A slipper pad structure comprising a member having a substantially flat bearing surface, provided with a surface layer of suitable bearing metal and a member fixedly connected to the first member and having a spherical hardened bearing surface, said first member having an opening and said second member having a projecting portion received and fixed in said opening.

2. A slipper pad structure comprising a member having a substantially flat bearing surface, provided with a surface layer of suitable bearing metal and a member fixedly connected to the first member and having a spherical hardened bearing surface, said first member having an opening therein and said second member having a flat portion seating on the surface surrounding the opening and a projecting portion having a drive fit in said opening.

WILLIAM P. MAINES.